United States Patent [19]

Decker

[11] 4,338,872
[45] Jul. 13, 1982

[54] MULTIPLE SECTION GRAIN DRILL

[76] Inventor: Lester H. Decker, R.R. 3, Wichita, Kans. 67220

[21] Appl. No.: 139,646

[22] Filed: Apr. 14, 1980

[51] Int. Cl.³ .............................................. A01C 5/00
[52] U.S. Cl. ........................................ 111/56; 111/85; 172/311; 172/456; 172/662; 198/313; 198/666; 280/639
[58] Field of Search .................................. 111/55–57, 111/85, 1; 172/311, 456, 662; 280/411 R, 411 A, 412, 413, 639, 656; 198/313, 632, 666

[56] References Cited

U.S. PATENT DOCUMENTS

| 528,901 | 11/1894 | Dodd | 172/538 |
|---|---|---|---|
| 2,496,885 | 2/1950 | Milton | 111/85 |
| 3,744,441 | 7/1973 | Smith et al. | 111/1 |
| 3,749,035 | 7/1973 | Cayton et al. | 172/4 X |
| 3,971,446 | 7/1976 | Nienberg | 111/1 X |
| 3,990,521 | 11/1976 | Ankenman et al. | 172/311 |
| 4,044,697 | 8/1977 | Swanson | 111/88 X |
| 4,126,187 | 11/1978 | Schreiner et al. | 280/411 A |
| 4,214,637 | 7/1980 | Applequist | 172/311 X |

FOREIGN PATENT DOCUMENTS

| 2455660 | 7/1975 | Denmark | 111/57 |
|---|---|---|---|
| 2315212 | 7/1977 | France | 172/311 |
| 2345898 | 10/1977 | France | 172/311 |
| 2359452 | 3/1978 | France | 111/34 |
| 515481 | 6/1976 | U.S.S.R. | 172/311 |

Primary Examiner—James R. Feyrer
Attorney, Agent, or Firm—John H. Widdowson

[57] ABSTRACT

A multiple section grain drill has a main frame with a transverse segment; a grain container mounted on the frame for receiving grain; an auger mounted on the main frame and in communication with the grain in the container for bidirectionally moving the grain; at lease one wing frame slidably engaging the main frame; hydraulic power for moving the wing frame; a wing auger mounted on the wing frame for receiving grain from the auger; furrow openers connected to the transverse segment and to the wing frame for generating furrows; grain distributing tubes in communication with the auger and wing auger for depositing the grain in the generated furrows; furrow closing and pressing members attached to the transverse segment and to the wing frame; and power for driving the auger and wing auger, for pivoting the furrow opener and furrow closing, for pressing, and for rendering power to the hydraulic power.

9 Claims, 17 Drawing Figures

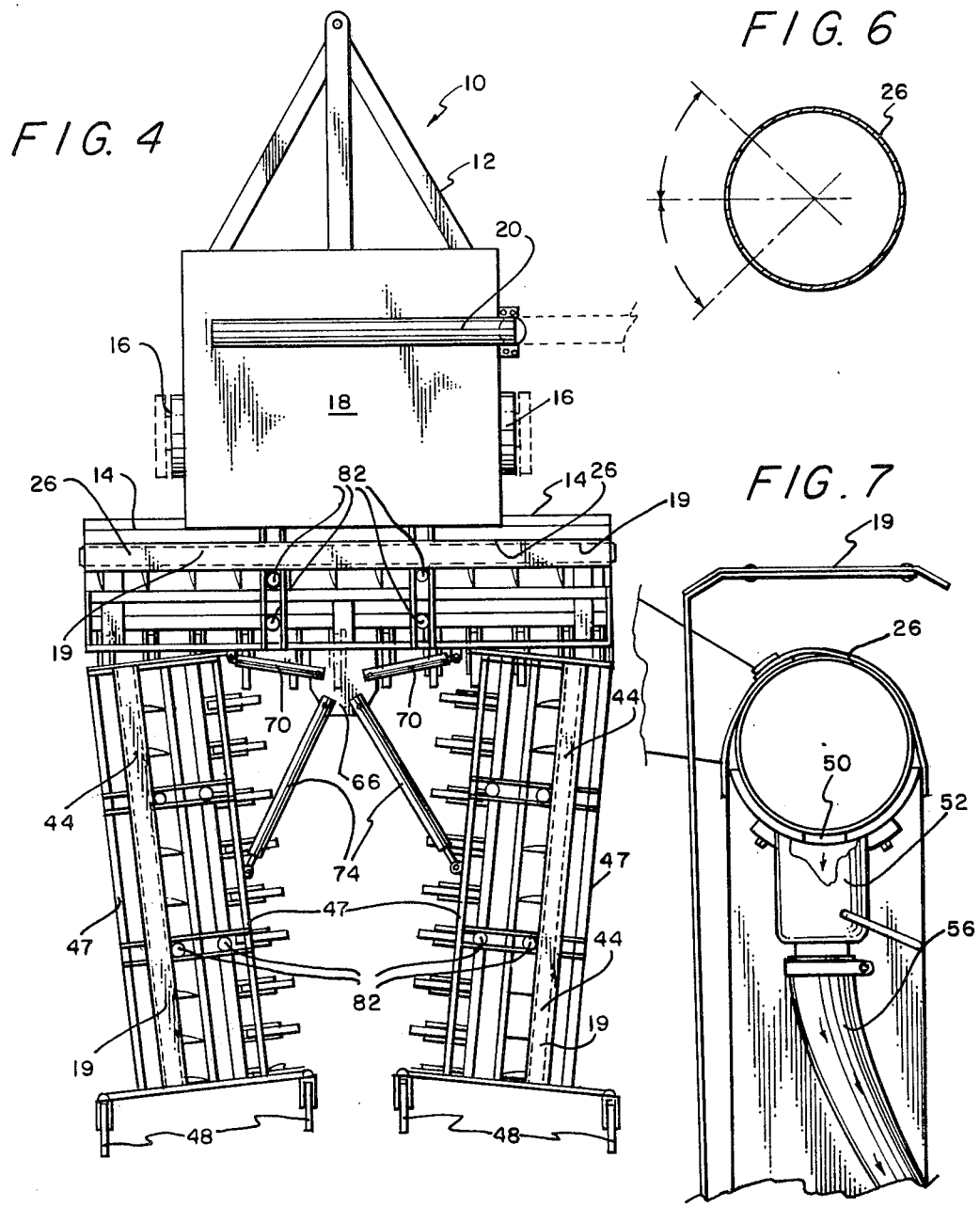
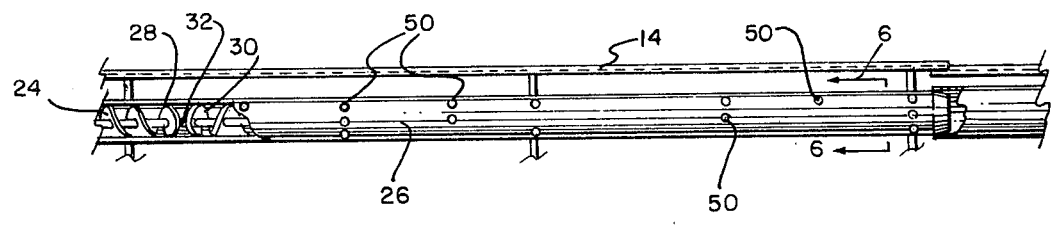

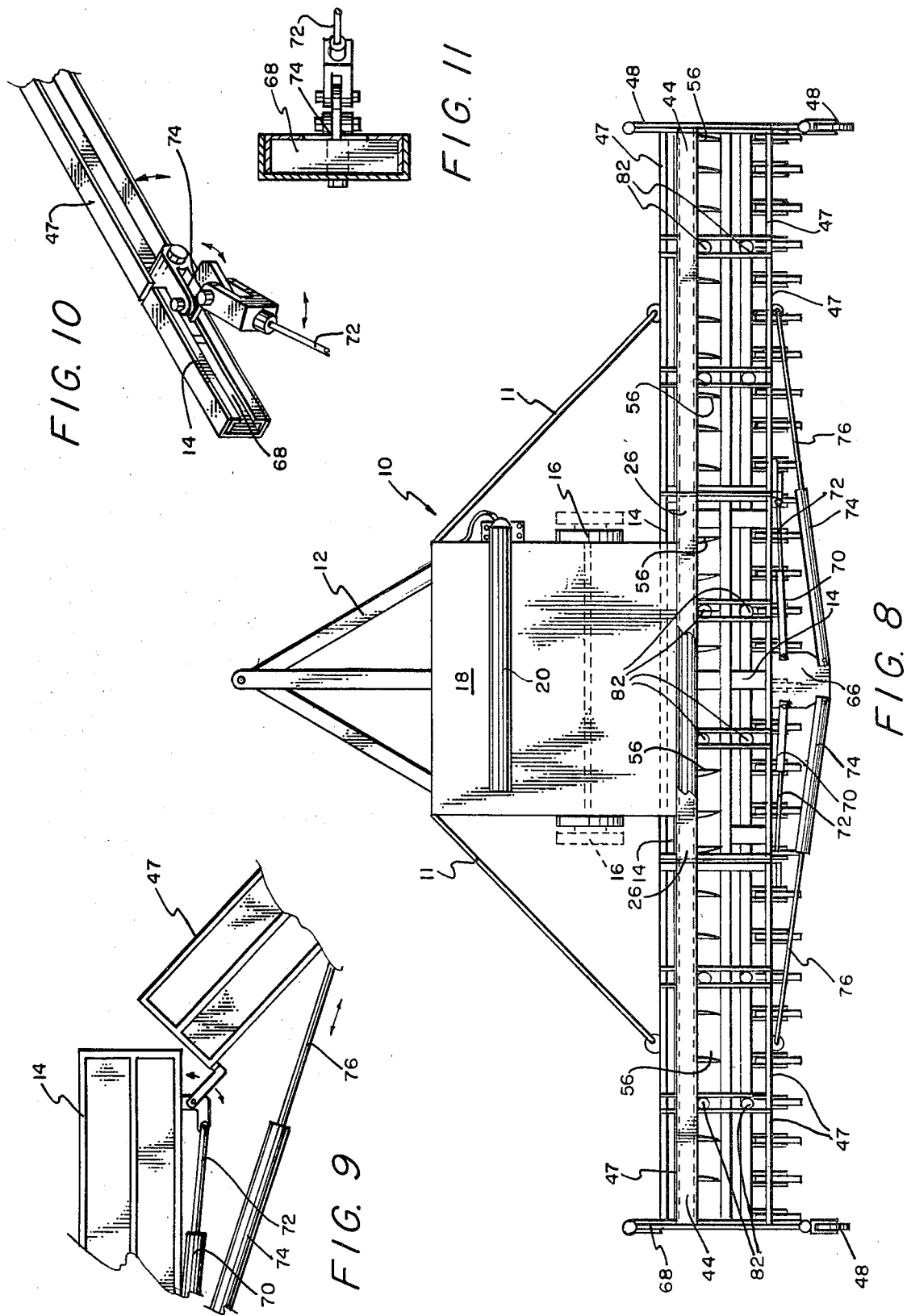

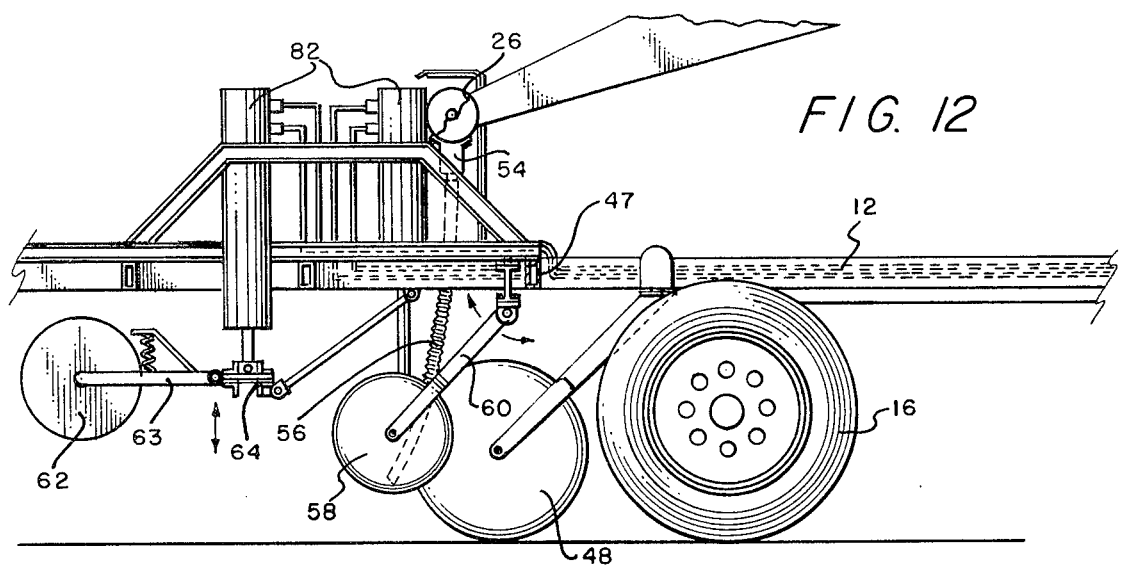
FIG. 12
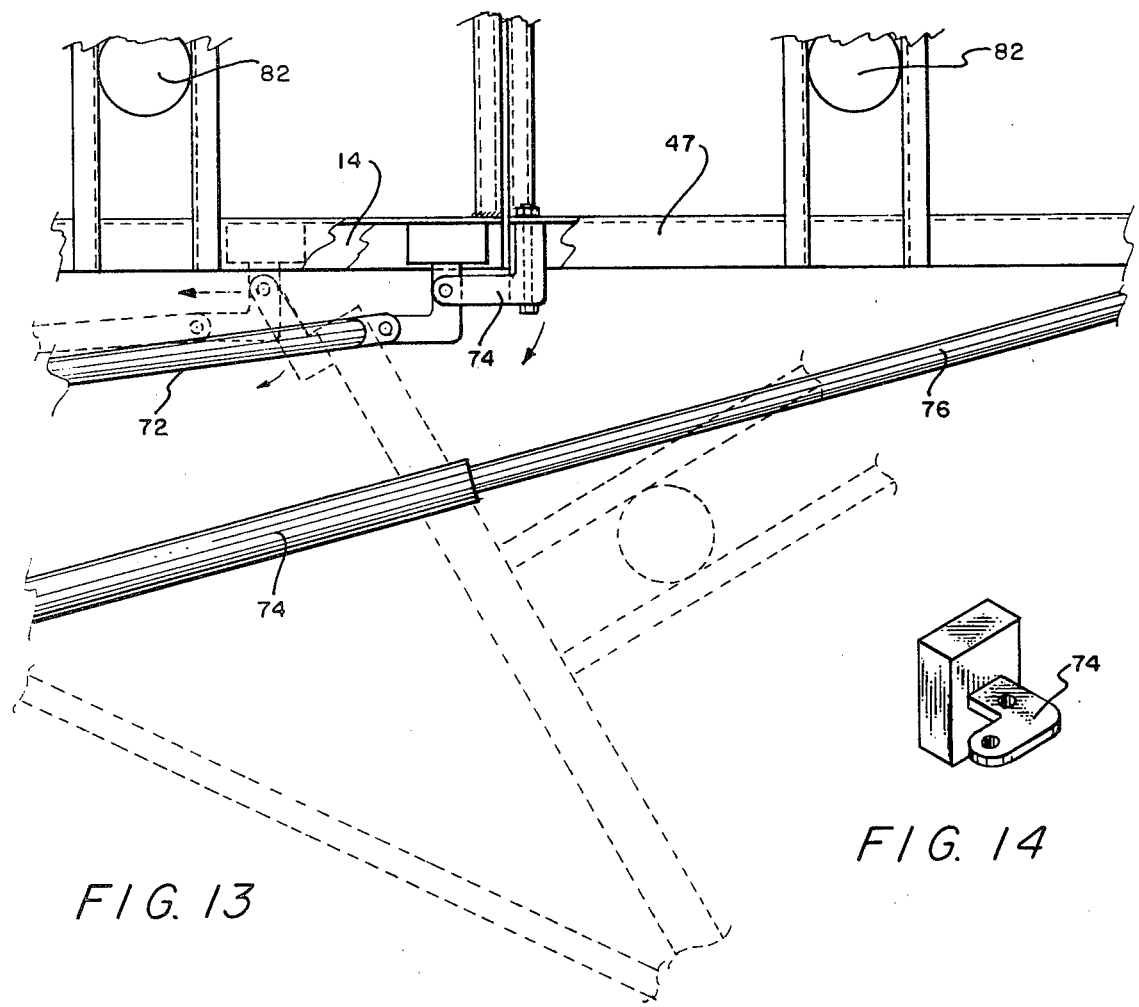
FIG. 13
FIG. 14

MULTIPLE SECTION GRAIN DRILL

BACKGROUND OF THE INVENTION

1. Field of the Invention

This invention provides a grain drill. More specifically, this invention contemplates a novel grain drill which has a pair of wing frames that are in a fore-and-aft position, and on a transverse position when the grain drill is in a working position.

2. Description of the Prior Art

U.S. Pat. No. 4,126,187 by Schreiner et al discloses a rearfolding implement. U.S. Pat. Nos. 3,749,035, 2,496,885, and 528,901 by Cayton et al, Milton, and Dodd, respectively, teach a planter. U.S. Pat. No. 3,809,316 by Dreyer discloses a machine for the distribution of granulated and powdered materials. None of the foregoing prior art illustrate this invention.

SUMMARY OF THE INVENTION

This invention accomplishes its desired objects by providing a multiple section grain drill for being towed by a tractor, or the like, comprising a main frame including a transverse segment and two which rotatably connected to the frame. A grain container is mounted on the frame for receiving grain. A central flight means is mounted on the transverse segment of the main frame and in communication with the grain in the container for bidirectionally moving the grain. At least one wing frame slidably engages the main frame. A means is connected to the main frame for shifting the wing frame from a fore-and-aft position with respect to the main frame to a transverse position with respect to the same or vice versa in order to align the wing frame with the transverse segment of the main frame; the wing frame when in the transverse position being in the working position and when in the fore-and-aft position being in the travelling position. A wing flight means is mounted on the wing frame and is collinear with and is engaged by the central flight means when the wing frame is in the transverse position in order to unidirectionally transport grain away from the central flight means. Furrow opener means is pivotally attached to the transverse segment and to the wing frame for generating furrows and grain distributing means is in communication with the central flight means and the wing flight means for departing the grain in the generated furrows. Furrow closing and pressing means is pivotally connected to the transverse segment and to the wing frame in order to direct sod into the furrow to cover the grain therein and to press the soil covering the grain.

It is an object of the invention to provide a novel grain drill.

Still further objects of the invention reside in the provision of a grain drill which has a multiple of sections, easily transported, and capable of being easily positioned in a working position.

These together with the various ancillary objects and features will become apparent as the following description proceeds are attained by this multiple section grain drill, a preferred embodiment being shown in the accompanying drawings, by way of example only, wherein:

BRIEF DESCRIPTION OF THE DRAWINGS

FIG. 4 is a top plan view of the grain drill in the travelling position;

FIG. 5 is a partial top plan view of the central auger rotatably lodged within the central conduit with the auger being constructed to move grain bidirectionally;

FIG. 6 is a vertical sectional view taken along the plane of line 6—6 in FIG. 5;

FIG. 7 is a partial exploded vertical sectional view of the central auger on top of the central cradle which has a seed tube extending therefrom;

FIG. 8 is a top plan view of the drain in the operating position;

FIG. 9 is a partial top plan view of the main frame and a wing frame being pivoted into an operating position by the hydraulic cylinders;

FIG. 10 is a partial, enlarged perspective view of a hinge slidably engaging the channel of the main frame, connecting to a wing frame, and including a hydraulic arm pivotally attached thereto;

FIG. 11 is a partial vertical sectional view of the hinge of FIG. 10 disclosing the channel of the main frame;

FIG. 12 is a partial side elevational view of the grain drill disclosing the furrow opener and the furrow closing and pressing means;

FIG. 13 is an enlarged, partial top plan view of the main frame, the wing frame, with dotted lines indicating a position of the wing frame in the process of being moved to a working or travelling position;

FIG. 14 is a perspective view of the hinge;

DETAILED DESCRIPTION OF THE INVENTION

Figure 1:
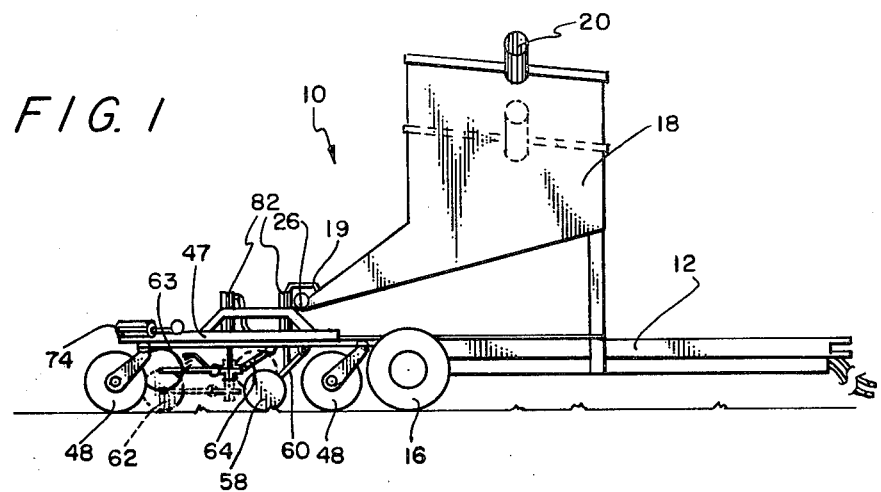
FIG. 1 is a side elevation view of the grain drill in operating position with an optional hopper or container shown in dotted lines.
Figure 2:
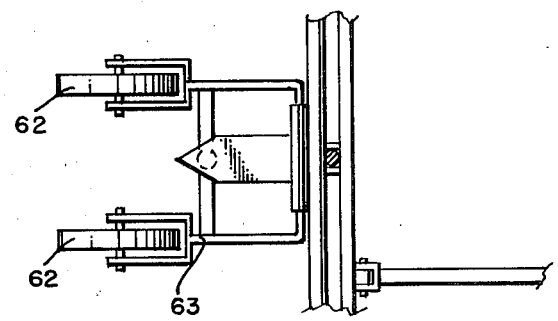
FIG. 2 is a partial top plan view taken along the plane of linw 2—2 in FIG. 3.
Figure 3:
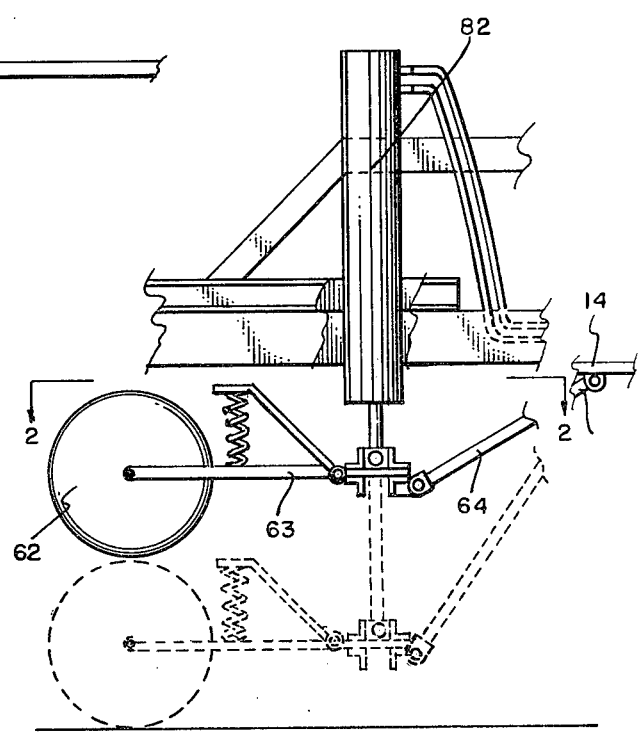
FIG. 3 is a side view of the furrow closing and pressing wheels with the operating position shown as dotted lines.

Referring in detail now to the drawings, wherein like reference numerals designate similar parts throughout the various views, there is seen a multiple section grain drill, generally illustrated as 10, having a main frame 12 with a transverse segment 14. Wheels 16 rotatably connect to main frame 12. A grain container 18 with hydraulic loader 20 (and optional hydraulic loader 22 on container in dotted lines) is mounted on the main frame 12 for receiving grain.

Figure 15:
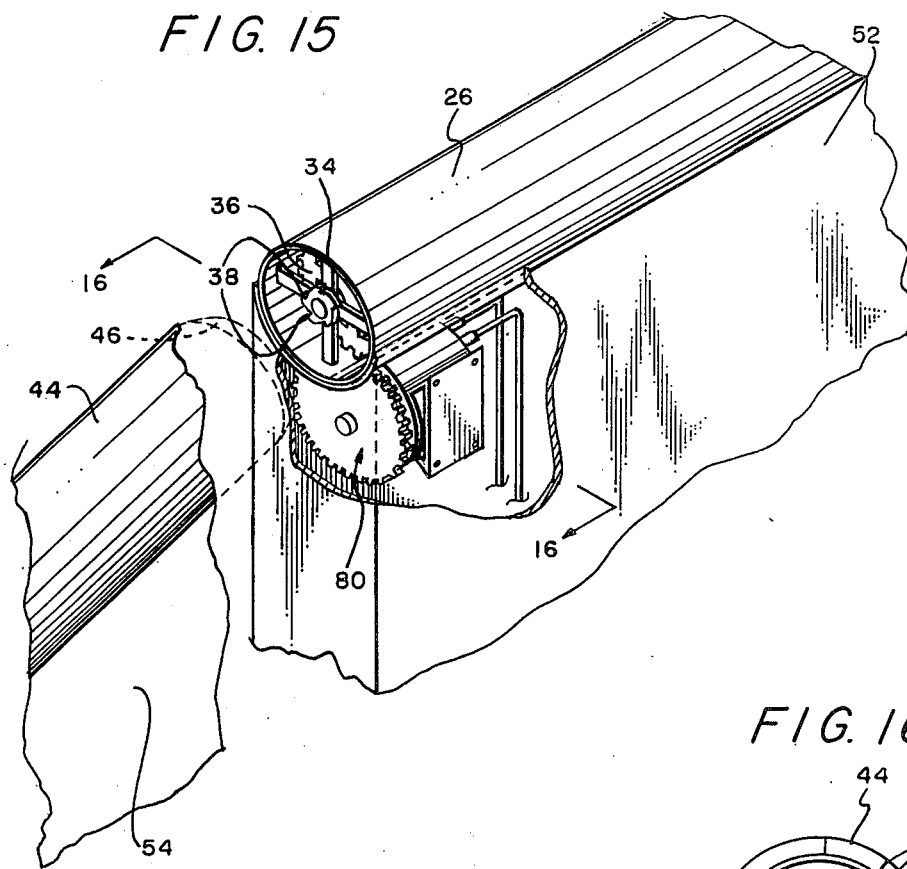
FIG. 15 is a partial perspective view of the hydraulic operated gears in operating position to rotate the central auger.
Figure 16:
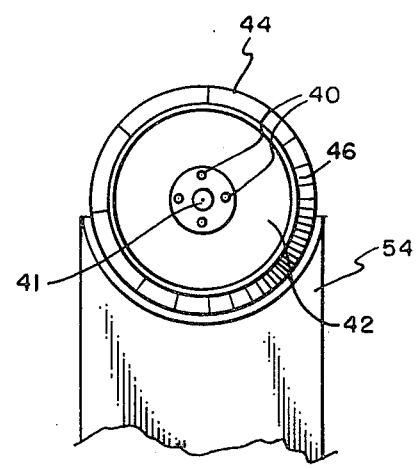
FIG. 16 is a side elevational view taken along the plane of line 16—16 in FIG. 15.

Auger 24 is mounted within a central conduit 26 which is connected to the transverse segment 14 and includes a shield 19. Auger 24 has a pair of auger segments 28, 30 (see FIG. 5) joining at point 32 and each auger segment 28 and 30 has helical fins that are constructed such as to move grain in the opposite direction from each other and point 32. Auger 24 has a central drive shaft 34 (see FIG. 15) including a gear 36 attached thereto and female recesses 38. Female recesses 38 receive and mate with male pins 40 (see FIG. 16) which are connected to a drive shaft 41 having a wing auger 42 and rotatably positional within a wing conduit 44 including a tapered end 46 for sliding into an end of conduit 26 to prevent grain from falling therebetween. Conduit 44 is mounted on wing frame 47 and has weather protection by shield 19. When male pins 40 mate within recesses 38, drive shaft 41 is driven by shaft 34 in order for auger 42 to convey grain away from auger 24. Wing frame 47 has wheels 48 rotatably mounted thereunder. Container 18 is braced to wing frame 47 (see FIG. 8) by bar 11 when grain drill 10 is in the working position. Conduits 26 and 47 each include a plurality of apertures 50 whose function is to meter the grain as the grain trickles through apertures 50 of conduit 26 into a central cradle 52 or through apertures 50 of conduit 44 into a wing cradle 54. Cradles 52 and 54 receive the metered grain in order to pass the grain into seed tubes 56 (see FIG. 7) which deposit the grain in furrows generated by shear wheels 59 rotatably connected to bars 60 (see FIG. 12) which are pivotally connected to wing frame 47 and to segment 14. After the grain has been deposited into the furrow, wheels 62, rotatably mounted on spring biased bars 63 which are attached to drawbars 64, direct soil into the furrows to cover the grain therein and to press the soil covering the grain. Drawbars 64 are pivotally connected to segment 14 and frame 47.

A tongue 66 attaches to segment 14 which also has a channel 68 traversing the aft section of same. Inside hydraulic cylinders 70 attach to tongue 66 and have arms 72 which pivotally attach to hinges 74 that are bound to a corner of wing frame 47 (see FIGS. 13, 14, 10 and 11) and slidably lodge within channel 68. Outside cylinders 74 also pivotally attach to the tongue 66 and includes arm 76 pivotally connecting to the wing frame 47.

Figure 17:
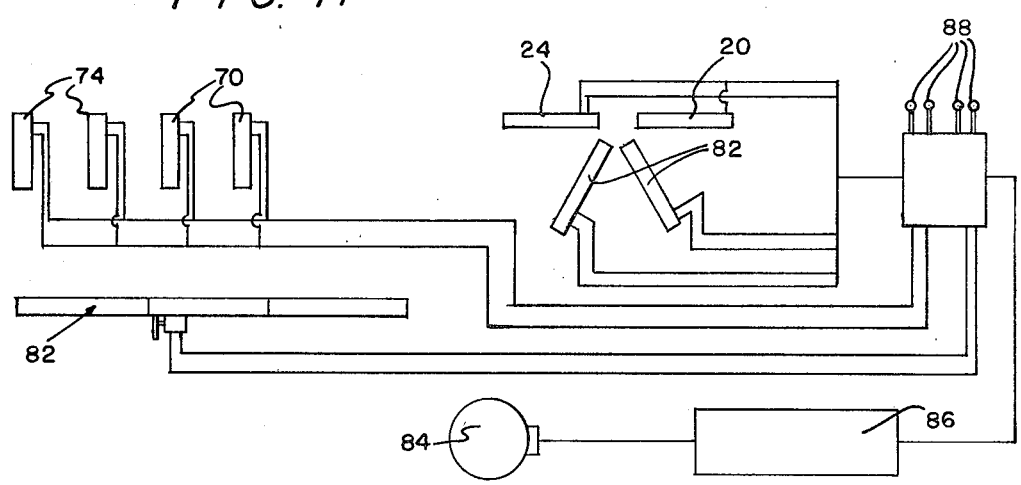
FIG. 17 is a block diagram of the hydraulic system for the grain drill.

Hydraulic cylinders 70 and 74 shift the wing frame 47 from a fore-and-aft travelling position with respect to the main frame 12 to a working transverse position with respect to same. Cylinders 70 and 74 operate on hydraulic power. Auger 24 also operates on the hydraulic power (see FIG. 15) when hydraulic gear means, generally illustrated as 80, engages gear 36. Shear wheels 58 and wheels 62 include a plurality of hydraulic cylinders 82 which receive the hydraulic power to adjust the height of wheels 58 and 62 with respect to the ground. The hydraulic power is generated from a pump 84 in communication with fluid reservoir 86 and controlled by controls 88 (all mounted on the tractor). FIG. 17 is a block diagram of the hydraulic system of this invention.

With continuing reference to the drawings for operation of the invention, controls 88 are used to hydraulically activate cylinders 70 and 74 to swing wing frames 47 from the travelling positions of FIG. 4 to the working positions of FIG. 8. Prior to this, hydraulic loader was hydraulically activated to load grain into container 18 which is gravity fed into hydraulic operated auger 24. When the grain drill 10 is in the desired position in the field, hydraulic auger 24 is activated; this also rotates auger 42. Grain starts bidirectionally moving from auger 24 to augers 42. Hydraulic cylinders 82 are activated to lower shear wheels 58 and pressing, closing wheels 62. As grain is being conveyed by augers 24 and 42, it is metered by apertures 50 into cradles 52 and 54 which pass the grain into tubes 56 in order to be deposited into the furrows generated by wheels 58. Wheels 62 close soil over the grain within the furrows, and press the soil. After a field has been seeded, hydraulic cylinders 70 and 74 are reactivated by controls 80 to swing the wing frames 47 back to the travelling fore-and-aft position of FIG. 4.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A multiple section grain drill for being towed by a tractor, or the like, comprising:

(a) a main frame including a transverse segment;
   (b) at least two (2) wheels rotatably connected to said frame;
   (c) a grain container mounted on said frame for receiving grain;
   (d) a central flight means mounted on said transverse segment of said main frame and in communication with the grain in the container for bidirectionally moving said grain;
   (e) at least one wing frame slidably engaging said main frame;
   (f) a means connected to said main frame for shifting said wing frame from a fore-and-aft position with respect to said main frame to a transverse position with respect to same or vice versa in order to align the wing frame with the transverse segment of said main frame, said wing frame when in the transverse position being in the working position and when in fore-and-aft position being in the travelling position;
   (g) a wing flight means mounted on said wing frame, collinear with and being engaged by said central flight means when said wing frame is in the transverse position in order to unidirectionally transport grain away from said central flight means;
   (h) furrow opener means pivotally attached to said transverse segment and to said wing frame for generating furrows;
   (i) grain distributing means in communication with said central flight means and said wing flight means for depositing said grain in said generated furrows;
   (j) furrow closing and pressing means to direct soil into the furrow to cover the grain therein and to press the soil covering the grain, said furrow closing and pressing means being pivotally connected to said transverse segment and to said wing frame; and
   (k) power take off means from said tractor, or the like, for driving said central flight means which in turn drives said wing flight means, for pivoting said furrow opener means and said furrow closing and pressing means to adjust the height of same with respect to the ground, and for rendering power to said means for shifting said wing frame, said means connected to said main frame for shifting said wing frame from a fore-and-aft position with respect to said main frame to a transverse position with respect to same or vice versa in order to align the wing frame with the transverse segment of the main frame comprises a tongue attached to the aft of said transverse segment; said transverse segment having a channel traversing the aft section of same; at least one inside hydraulic cylinder pivotally connected to said tongue and having an inside hydraulic arm; a hinge bound to a corner of said wing frame and slidably lodged within said channel; said inside hydraulic arm pivotally attaching to said hinge; an outside cylinder pivotally attached to said tongue and including an outside hydraulic arm pivotally connected to said wing frame; a hydraulic power means for rendering power to said inside and outside hydraulic cylinder, said hydraulic power means being controlled and coming from said tractor, or the like.

2. The grain drill of claim 1 wherein said central flight means is a central auger rotatably situated within a central conduit and including a structure defining a pair of auger segments, each auger segment having helical fins that are constructed such as to move grain in the opposite direction from each other; said central auger including a central drive shaft with a first gear means connected thereto, said central drive shaft including at least one female recess; said wing flight means being a wing auger rotatably positioned within a wing conduit and including a structure defining helical fins that are constructed such as to move grain away from said central auger; said wing auger having a wing drive shaft including at least one male pin for mating with said female recess to take power off said central drive shaft for rotating said wing drive shaft for conveying grain away from said central auger.

3. The grain drill of claim 2 wherein said wing conduit includes a tapered end for sliding into an end of said central conduit to prevent grain from falling between said wing and central conduit as the grain leaves the central conduit for conveyance within the wing conduit.

4. The grain drill of claim 3 wherein said power take off means for driving said central flight means comprises a second gear means, a hydraulic power means for rotating said second gear means, said hydraulic power means being controlled and coming from said tractor, or the like, said second gear means attaching to said transverse segment of said main frame at a position in order to mesh with said first gear means in order to drive the central drive shaft.

5. The grain drill of claim 4 wherein said central conduit and said wing conduit each comprises a structure defining a plurality of apertures whose function is to meter the grain.

6. The grain drill of claim 5 additionally including a central cradle positioned under said central conduit and a wing cradle situated under said wing conduit, said central and wing conduit receiving said metered grain.

7. The grain drill of claim 6 wherein said grain distributing means comprises a plurality of seed tubes in communication with said central cradle and said wing cradle for depositing the grain.

8. The grain drill of claim 7 wherein said power take off means for pivoting said furrow opener means and said furrow closing and pressing means for adjusting the height of all of the same with respect to the ground comprises a plurality of hydraulic cylinders receiving hydraulic power from a means on said tractor, or the like, to furnish hydraulic power and to control the same.

9. The grain drill of claim 8 comprising a pair of wing frames, each being supported by a pair of wheels, said grain container comprising a loading auger means, and said wing frames each comprising a bar member connecting from said wing frame to said grain container.

* * * * *